United States Patent [19]

Kim

[11] Patent Number: 5,743,561
[45] Date of Patent: Apr. 28, 1998

[54] LIGHT MOTORCYCLE ROLL BAR

[76] Inventor: Sinil Kim, 548 Ford Ave., Solana Beach, Calif. 92075

[21] Appl. No.: 528,443

[22] Filed: Sep. 14, 1995

[51] Int. Cl.[6] ........................................... B60R 21/13
[52] U.S. Cl. ............................................ 280/756; 180/219
[58] Field of Search ............................... 280/288.4, 756, 280/748; 180/209, 211, 219; 296/102

[56] References Cited

U.S. PATENT DOCUMENTS

| | | | |
|---|---|---|---|
| 1,473,956 | 11/1923 | Eyre et al. | 280/288.4 |
| 3,897,960 | 8/1975 | Cosby | 296/102 |
| 4,412,595 | 11/1983 | Kinzel | 280/756 |
| 4,416,465 | 11/1983 | Winiecki | 280/304.4 |
| 4,673,190 | 6/1987 | Ahlberg | 280/756 |
| 4,813,706 | 3/1989 | Kincheloe | 280/756 |
| 5,116,069 | 5/1992 | Miller | 180/210 |
| 5,257,671 | 11/1993 | Watkins | 180/209 |
| 5,503,430 | 4/1996 | Miki et al. | 280/756 |

FOREIGN PATENT DOCUMENTS

| | | | |
|---|---|---|---|
| 2-274678 | 11/1990 | Japan | 180/210 |
| 210698 | 7/1940 | Switzerland | 180/210 |

*Primary Examiner*—Paul N. Dickson

[57] ABSTRACT

The disclosure sets forth a roll-bar structure for a conventional motorcycle configured to provide both forward and aftward protection as well as side protection. The basic embodiment comprises dual spaced apart longitudinal tubular, metal members of inverted U-shaped design, the lower terminuses of which are oppositely fixed to both the front and rear of the motorcycle mainframe. Other embodiments include an articulated rear-half assembly which can move fore and aft according to the position of the motorcyclist, a longitudinal roll-bar configuration appearing substantially H-shaped in side view, and a combination of an inverted U-shaped roll-bar and an H-shaped roll-bar.

8 Claims, 7 Drawing Sheets

LIGHT MOTORCYCLE ROLL BAR

BACKGROUND OF THE INVENTION

This invention relates in general to motorcycles, and more particularly to a protective device for motorcycle operators.

Motorcycles are much lighter than automobiles and therefore are much more fuel efficient mode of transportation. However, because of the higher risk of major injury or even death, motorcycles have not become as popular as automobiles. If the risks of motorcycle riding are decreased, more people would switch from automobiles to motorcycles for personal transportation, which would reduce petroleum consumption and associated air pollution, along with "greenhouse" effect.

In the past, protective shells or cages have been designed to completely enclose a motorcycle for protection of motorcycle operator, but these devices are bulky, restrictive, and heavy.

Eyre in U.S. Pat. No. 1,473,956, issued in 1923, describes an attachment to motorcycle comprising a cage that substantially enclose the motorcycle and is substantially circular in cross section. Such an enclosing cage device is bulky, restrictive, and heavy.

Kinzel in U.S. Pat. No. 4,412,595, issued in 1983, describes a vertical transverse roll bar extending from one side of the vehicle body to the other with a longitudinal roll bar extending vertically from the back of the body and secured to the transverse roll bar and with a seat spring mounted from the roll bars. Since the longitudinal roll bar is secured only to the back of the vehicle and not secured to the front of the vehicle, the operator of the vehicle is left largely unprotected in the event of a frontal collision.

Carter in U.S. Pat. No. 4,560,196, issued in 1985, describes a convertible cover supported by flexible rods. The convertible cover is specifically designed only to protect the operator from the elements and do not offer significant protection to the operator in the event of a collision.

Ahlberg in U.S. Pat. No. 4,673,190, issued in 1987, describes a side bar mounted on transverse front and rear bars, which in turn are mounted on the frame, with the rear bar being mounted behind the seat and above the rear wheel. However, the side bar is designed for protection of operator's legs from impact with automobile bumper and leaves the operator's torso largely unprotected. Ahlberg also describes motorcycle roll bar attached to the sidebar rather than directly to the frame, which weakens the rollbar. Furthermore, Ahlberg's roll bar extends upward behind the motorcycle operator, leaving the front of the operator's torso, and the front of head and neck exposed in the event of frontal or lateral collision.

OBJECT OF THE INVENTION

It is the primary objective of this invention to provide protective means for motorcycle operators that is light and not excessively restrictive, yet offer substantial protection in the event of a collision. A strong, substantially non-flexible light-weight bar or tubing is used to provide one or more roll bars to protect the operator from high-speed objects coming at him/her from frontal as well as from posterior direction.

It is a further object of this invention to provide personal restraining device to keep the motorcycle operator securely fastened to the roll bar, to prevent the operator from being thrown from the motorcycle and to cushion the impact in the event of collision.

Still another object of this invention is to provide two or more roll bars, interconnected with interconnecting pieces, to increase protection compared to a single roll bar.

Still another object of this invention in to provide increased visibility of motorcycle to other motorists for improved safety.

SUMMARY OF THE INVENTION

Roll bar is generally defined as a substantially nonflexible tubing or bar secured to the motorcycle that protect the motorcycle operator's torso and head in case of a turnover or collision. In present invention, the roll bar is secured directly to the motorcycle frame rather than being secured through a intervening structure such as a side bar. Since the motorcycle frame itself is generally the most secure structure in a motorcycle, directly securing the roll bar to the motorcycle frame confers strength to the roll bar in case of a collision and results in greater protection to the operator.

One embodiment of this invention provides "front-to-back" roll bar, which is defined in this disclosure as a roll bar that stretches from front of the motorcycle to the back, with the front end of the roll bar directly secured to the front portion of the motorcycle frame and the back end of the roll bar directly secured to the back portion of the motorcycle frame. Since a part of the roll bar is located to the front of the motorcycle operator's torso and head, the roll bar in present invention can protect the operator from objects colliding with him/her from frontal direction. In addition, since a part of the roll bar is located to the back of the back of the motorcycle operator's torso and head, the roll bar in present invention protects the operator from objects colliding with him/her from posterior direction.

The front-to-back roll bar can be located in the midline or two front-to-back roll bars, generally parallel, can be located one to the right and the other to the left of the midline. The latter embodiment has the advantage of avoiding obstruction of the motorcycle operator's central line of vision. Such parallel roll bars further reinforce each other's strength by having one or more connector pieces interconnect the parallel roll bars.

Another embodiment of the present invention provides "side-to-side" roll bar, which is defined in this disclosure as a roll bar that passes over the width of space occupied by the motorcycle operator. The "side-to-side" roll bar is located anterior to motorcycle operator's back, and it can protect the motorcycle operator from objects coming at the operator from the lateral direction.

Still another embodiment of the present invention provides the "front-to-back" roll bar and the "side-to-side" roll bar in combination.

DETAILED DESCRIPTION OF THE PREFERRED EMBODIMENTS

A motorcycle is any motor vehicle other than a tractor having a seat or saddle for the use of the operator and designed to travel on not more than three wheels in contact with the ground and weighing less than 1,500 pounds, except that four wheels may be in contact with the ground when two of the wheels are functional part of a sidecar.

A longitudinal plane of the motorcycle is the plane that bisects the motorcycle into left and right halves. All references to a motorcycle operator's anatomical position refers to that during the usual operation of the motorcycle.

A motorcycle frame is the main weight-bearing structural unit of the motorcycle, to which wheels, motor, fuel tank, and seat are attached.

A roll bar end is the extreme or last part lengthwise of the roll bar and the remainder of the roll bar is defined as mid section.

A side bar, as defined in this disclosure, is a generally horizontal bar whose ends are secured to roll bars and located entirely in one side of the longitudinal plane of the motorcycle.

Figure 1:
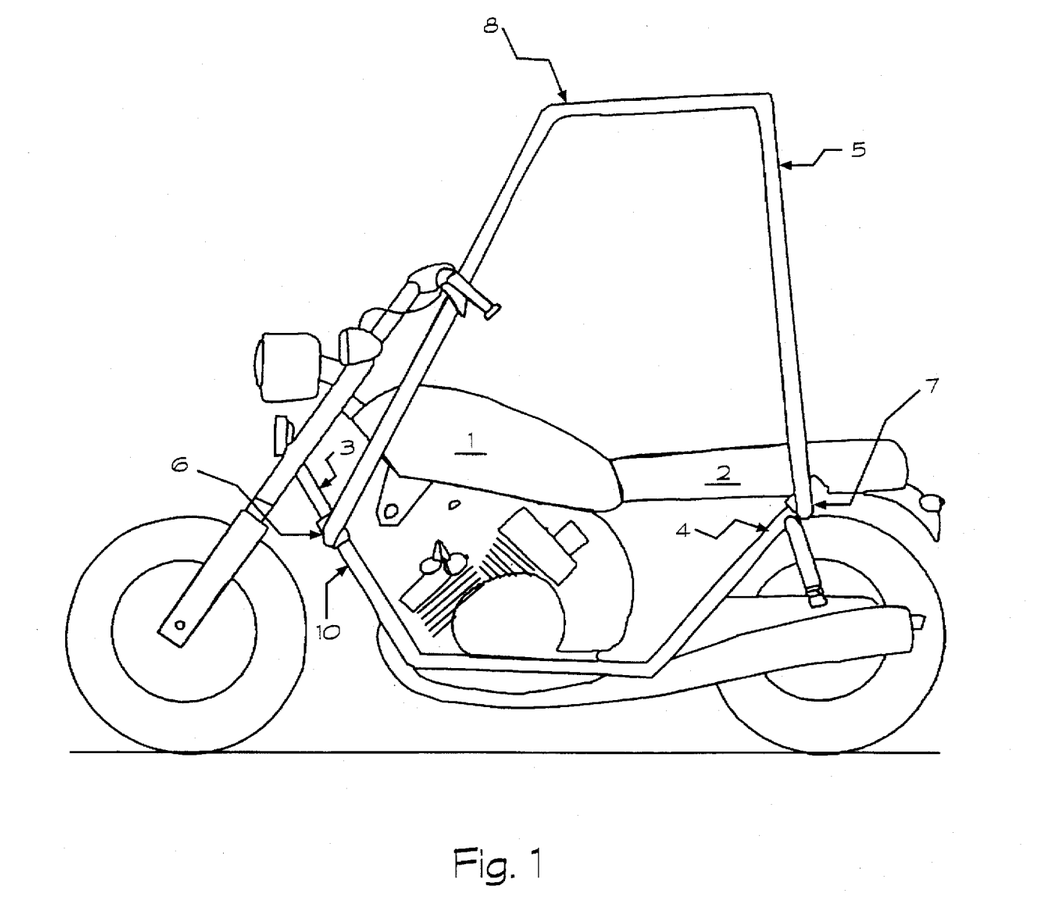
FIG. 1 is a side view of a motorcycle having the front-to-back roll bar secured to the front and back of the motorcycle frame.

Referring now to the drawings in detail, in FIG. 1, a motorcycle, 1, includes a seat, 2, for the motorcycle operator and front portion, 3, and rear portion, 4, of the motorcycle frame, 10. The motorcycle can be of any type or size, but preferably designed to travel on not more than two wheels in contact with the ground. The front-to-back roll bar, generally designated as 5, has the front roll bar end, 6, extending frontward and securing to the front portion, 3, of the motorcycle frame, 10. The other roll bar end, 7, extends backward and is secured to the rear portion, 4, of the motorcycle frame, 10. In addition to the two roll bar ends, the front-to-back roll bar has mid section, 8. The mid section, 8, is positioned preferably above the legs of the operator. More preferably, the mid section, 8, is positioned above the shoulder of the operator. Most preferably, the mid section, 8, is positioned above the head of the operator.

Figure 2:
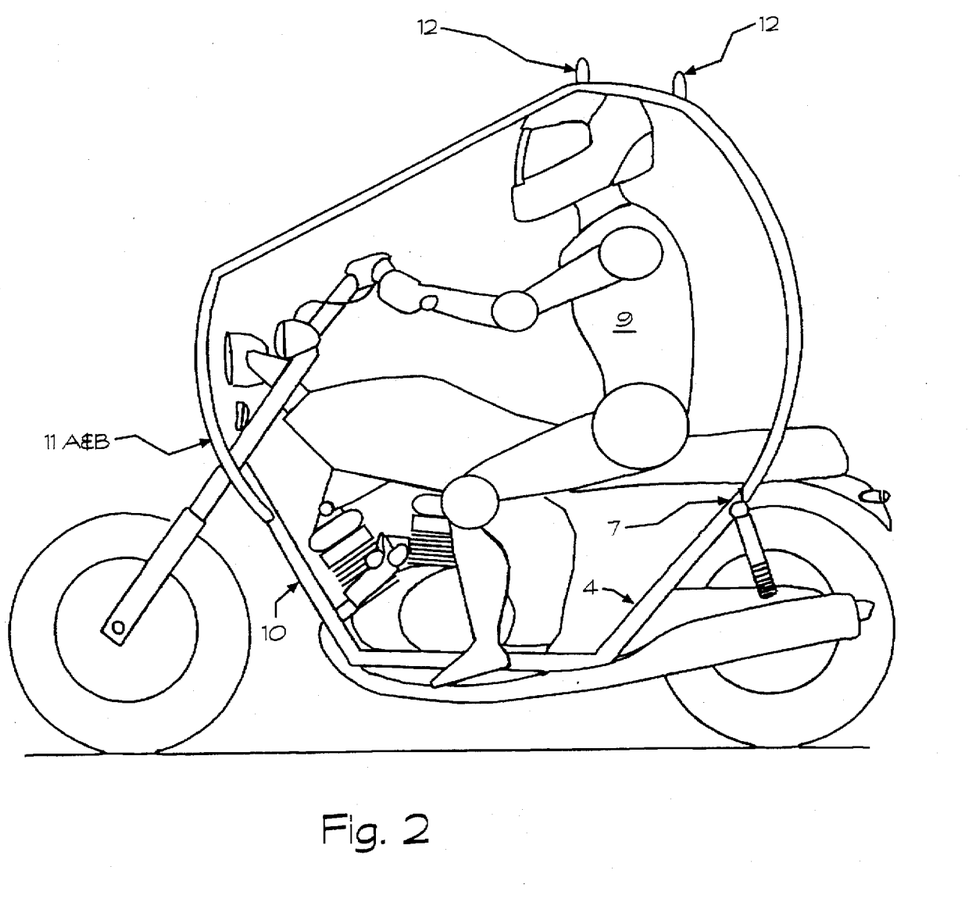
FIG. 2 is a side view of a motorcycle having two front-to-back roll bar, one located on left side, visible in this view from the left, and the other roll bar located on the right side, hidden from view by the first roll bar but understood to be in mirror image to the first.
Figure 3:
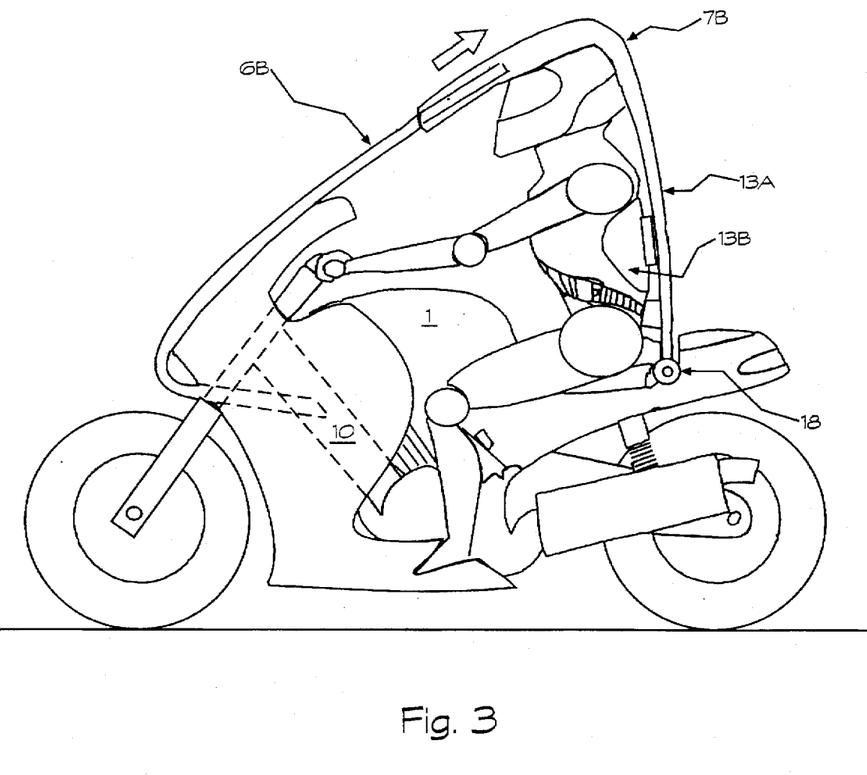
FIG. 3 is a side view of a motorcycle having the front-to-back roll bar with a sliding joint.

As another embodiment of the front-to-back roll bar, in FIG. 2, two generally parallel roll bars, 11a and 11b, are located one to the right, 11a, and the other to the left, 11b, of the motorcycle's longitudinal plane. The two roll bars are reinforced with interconnecting pieces, 12, to strengthen each of the two roll bars. The point for securing the back roll bar end, 7, of the front-to-back roll bar may be located any where along the rear portion, 4, of the motorcycle frame, 10, but the point of securing to the frame is preferable located behind motorcycle operator, 9. Alternately, the two generally parallel roll bars are joined to each other to form a single roll-bar end, either at the front roll bar end or rear roll bar end. For added protection, cushion, 13a, is secured to the roll bar, which softens impact in the event of a collision as shown in FIG. 3. Cushion, 13b, can serve as a back rest for the motorcycle operator.

Personal restraint system such as seat belt or lap belt, shoulder belt, 14, netting, or airbag system, is mounted or secured on to the front-to-back roll bars to cushion the operator and to prevent the operator from being thrown off the motorcycle in the event of a collision. For protection of the operator from the elements and inclement weather, flat or curved transparent material, such as stiff or flexible plastic sheet, plastic plate, plate glass, or combination thereof are attached to the roll bar. These transparent sheets or plates can be mounted on the roll bar either detachably or permanently.

For further improvement in safety, visibility-enhancing devices that increase visibility of motorcycle to other motorists are added to the roll bar. Such visibility enhancing devices include reflectors, electrically powered lights, and combinations, thereof.

Figure 4A:
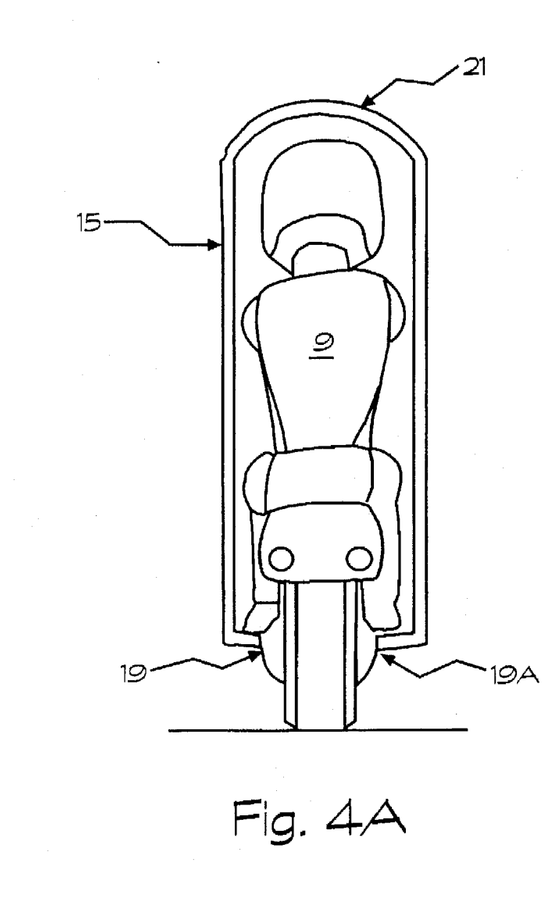
FIG. 4a is a rear view of a motorcycle having the side-to-side roll bar.
Figure 4B:
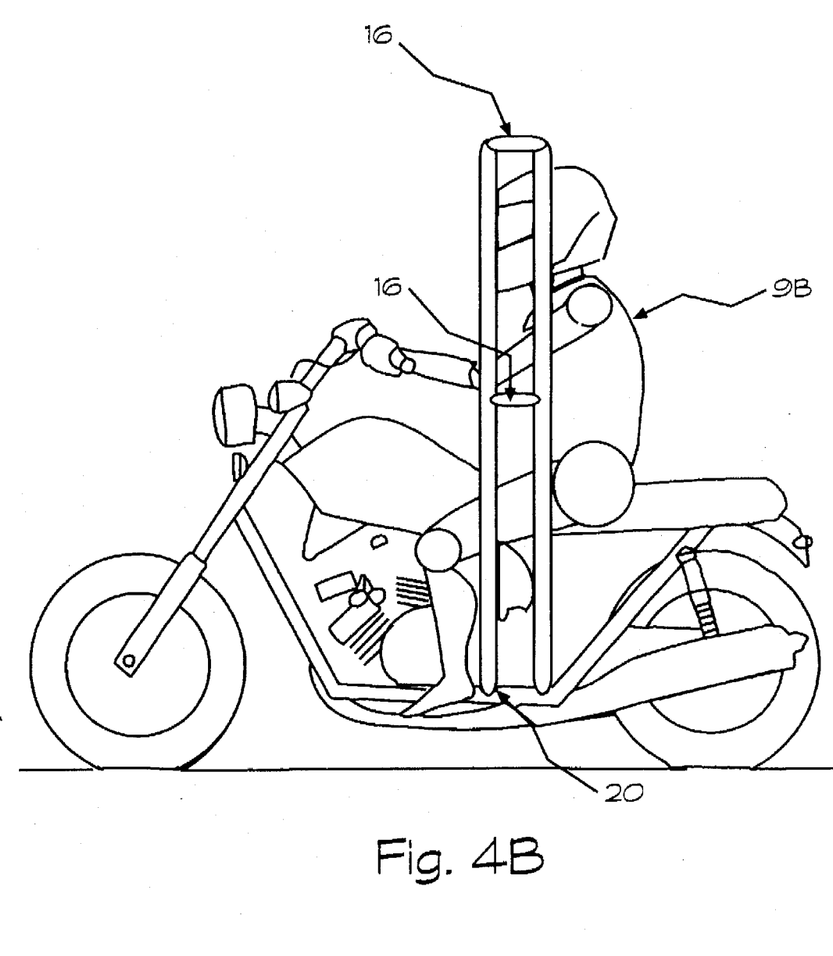
FIG. 4b is a side view of a motorcycle having two side-to-side roll bars.

FIG. 4a and 4b show the details of another embodiment of the present invention, i.e. side-to-side roll bar. Looking from the back, in FIG. 4a, the side-to-side roll bar, 15, has a left roll-bar end, 19, which is secured to a the motorcycle frame on the left-hand side, 20, of the motorcycle's longitudinal plane (FIG. 4b). The right roll-bar end, 19a, is likewise secured to the motorcycle frame on the right-hand side of the motorcycle's longitudinal plane. The mid section, 21, of the side-to-side roll bar preferably is located above the motorcycle operator, 9. To protect the motorcycle operator in case of a collision from lateral direction, the side-to-side roll bar is preferably located anterior to the operator's back, 9a. For increased strength of side-to-side roll bar, two or more side-to-side roll bars can be interconnected with each other via connecting pieces, 16, which increases the strength of the side-to-side roll bars.

Figure 5:
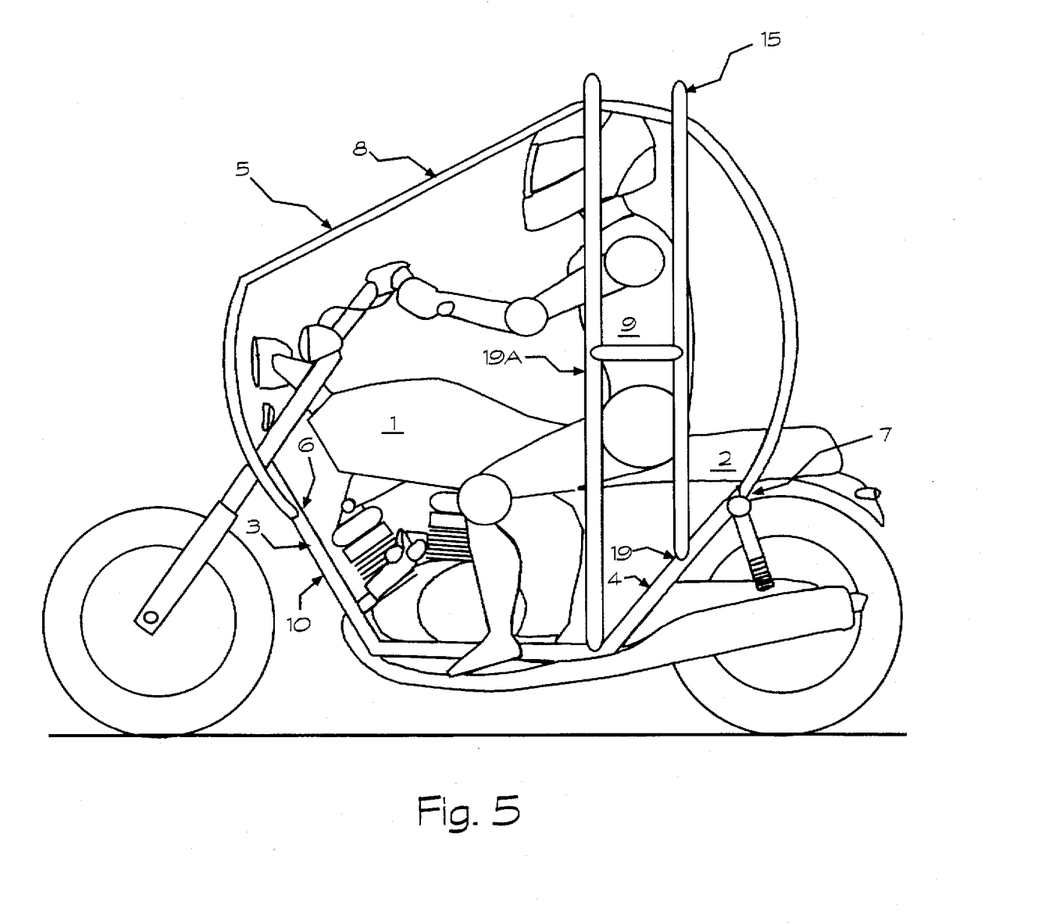
FIG. 5 is a side view of a motorcycle having two front-back roll bars and two side-to-side roll bars.

Further strengthening of side-to-side roll bar and front-to-back roll bars is shown in yet another embodiment of the present invention as demonstrated in FIG. 5. In this embodiment of the invention, front-to-back roll bar, 5, is combined and joined with side-to-side roll bar, 15. As was the case in the earlier front-to-back roll bar, the front roll bar end, 6, is secured to the front portion, 3, of the motorcycle frame 10. The roll bar also has back roll bar end, 7, attached to the rear portion, 4, of the motorcycle frame, 10. The roll bar additionally has mid section, 8, that is located above motorcycle seat, 2. The front-to-back roll bar, 5, is simply joined with the side-to-side roll bar, 15, which was described in previous paragraph, to provide protection from objects coming from front, back, left, right, and above the motorcycle. For ease of mounting and dismounting, one leg of the side-to-side roll bar, preferably the left leg, 19a, is pivotably secured to the rest of the roll bar assembly and the lower end, 19, is releasably secured to the motorcycle frame, 10. When the operator is mounting or dismounting, the upright leg can be pivoted out of the way. The pivotable attachment at the upper end of the upright leg is preferably constrained by a hinge joint and the releasable attachment to the frame at the lower end of the upright leg is preferably connected by a manually releasable latch.

FIG. 3 shows the details of still another embodiment of the invention wherein a sliding joint, 17, is located between two mid sections that are connected in head-to-tail fashion. Specifically, the posterior mid section, 7b, and the front mid section, 6b, are connected in head-to-tail fashion by means of a sliding joint, 17. This sliding joint enables the back member, 7b, the attached backrest, 13b, and the operator, 9, to pivot forward as a unit around the pivot point, 18, to reduce wind resistance or pivot backward to sit up straight for comfort. Again, two front-to-back roll bars, one to the right of the longitudinal plane and another to the left of the longitudinal plane, are interconnected together to increase strength. It is most preferable to locate the attachment point of the back member, 7b, to the frame, 10, behind the motorcycle operator, 9.

Figure 6A:
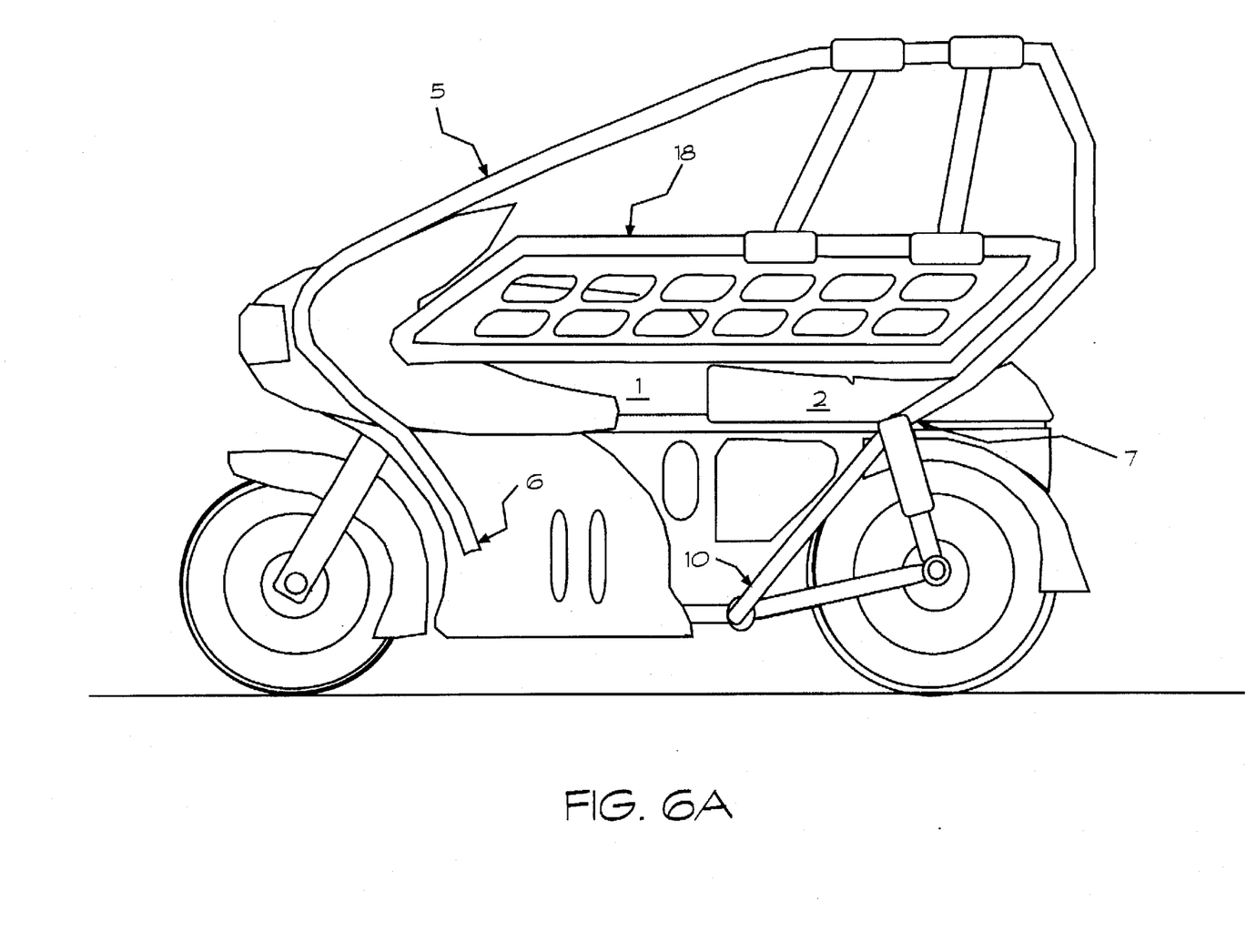
FIG. 6a is a side view of a motorcycle having two front-to-back roll bars with two side bars.
Figure 6B:
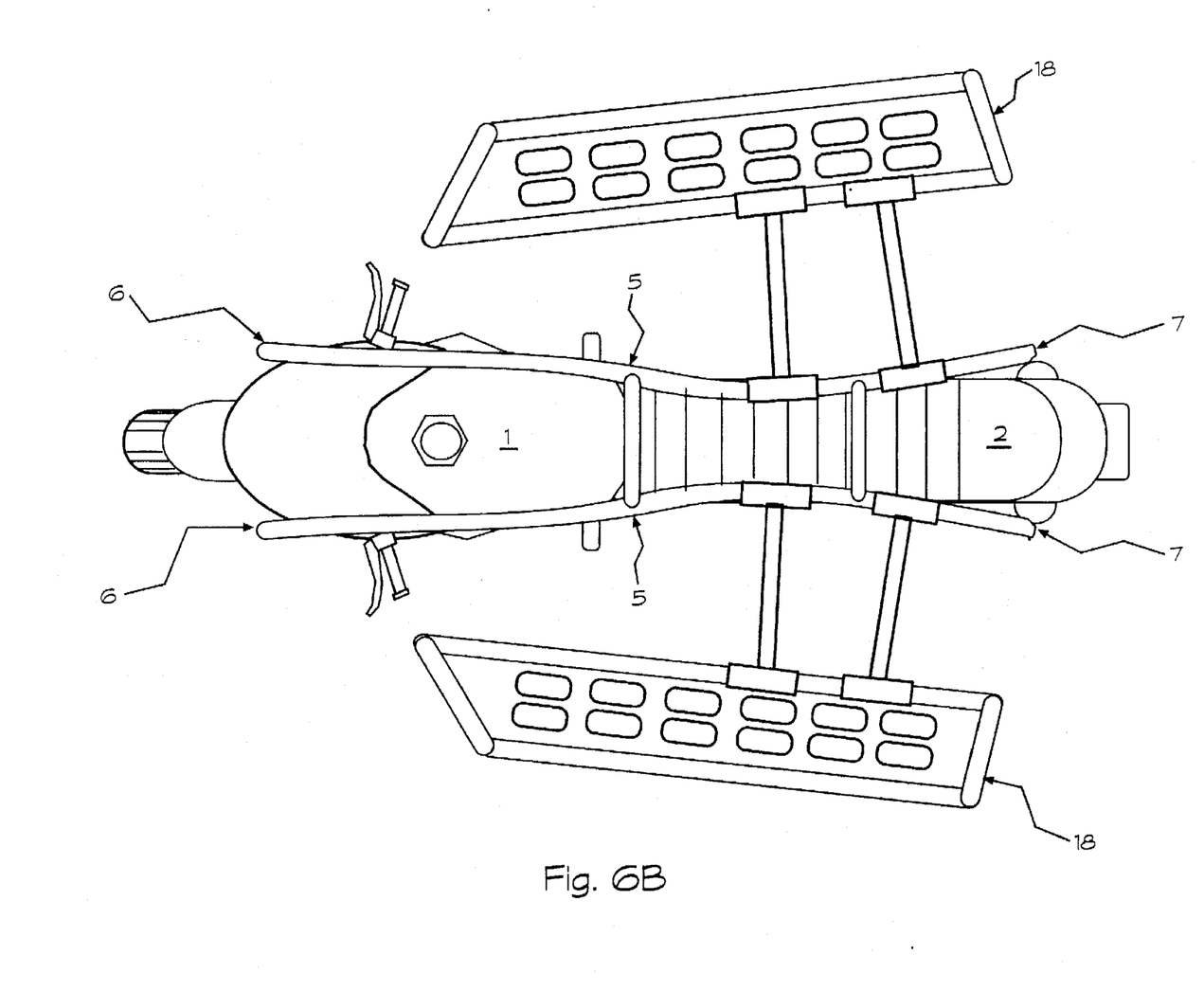
FIG. 6b is a top view of a motorcycle having two front-to-back roll bars and two side bars, with the side bars pivoted open for mounting.

FIG. 6a and 6b show the details of yet another embodiment of the invention wherein a side bar is secured to front-to-back roll bar to comprise a roll-bar-and-side-bar assembly. The front-to-back roll bar, generally designated again as 5, has the front roll bar end, 6, secured to the front portion of the motorcycle frame. The roll bar also has back roll bar end, 7, attached to the rear portion of the motorcycle frame. A side bar assembly, 18, is designed for protection of left or right side of motorcycle operator's torso. The side bar, 18, is preferably attached pivotably to the front-to-back roll bar for ease of mounting and dismounting.

I claim:

1. A rigid roll-bar subframe structure with a conventional two-wheeled motorcycle mainframe, configured to provide both head and shoulder protection to a motorcyclist for improved safety, the roll-bar structure comprising:

left and right laterally opposed symmetrically spaced apart tubular, metal sections arranged offset from a longitudinal center-line of the motorcycle mainframe;

at least one transverse member interconnecting said left tubular, metal section to said right tubular, metal section, thereby maintaining a fixed interval of spacing between said tubular, metal sections;

an attaching means for securing at least one frontal terminus and one aftward terminus of said left tubular, metal section to a left side of said motorcycle mainframe, and for securing at least one frontal terminus and one aftward terminus of said right tubular, metal section to a right-side of said motorcycle mainframe, thereby mounting said roll-bar structure rigidly upon said motorcycle mainframe for the safety protection of a motorcyclist;

wherein both said respective right and left tubular, metal sections are inverted U-shaped members as viewed in side-elevation; and wherein each said U-shaped member includes a pivotable side bar assembly for protection of left and right sides of the motorcyclist.

2. A rigid roll-bar subframe structure according to claim 1, wherein a foremost windshield is securely arranged transverse between said left and right tubular, metal sections.

3. A rigid roll-bar subframe structure with a conventional two-wheeled motorcycle mainframe, configured to provide both head and shoulder protection to a motorcyclist for improved safety, the roll-bar structure comprising:

left and right laterally opposed symmetrically spaced apart tubular, metal sections arranged offset from a longitudinal center-line of the motorcycle mainframe;

at least one transverse member interconnecting said left tubular, metal section to said right tubular, metal section, thereby maintaining a fixed interval of spacing between said tubular, metal sections;

an attaching means for securing at least one frontal terminus and one aftward terminus of said left tubular, metal section to a left side of said motorcycle mainframe, and for securing at least one frontal terminus and one aftward terminus of said right tubular, metal section to a right-side of said motorcycle mainframe, thereby mounting said roll-bar structure rigidly upon said motorcycle mainframe for the safety protection of a motorcyclist; and wherein both said right and left tubular, metal sections are H-shaped members as viewed in side-elevation.

4. A rigid roll-bar subframe structure according to claim 3, wherein both said right and left tubular, metal sections are a combination of inverted U-shaped and H-shaped members as viewed in side-elevation.

5. A rigid roll-bar subframe structure according to claim 3, wherein a foremost windshield is securely arranged transverse between said left and right tubular, metal sections.

6. A rigid roll-bar subframe structure with a conventional two-wheeled motorcycle mainframe, configured to provide both head and shoulder protection to a motorcyclist for improved safety, the roll-bar structure comprising:

left and right laterally opposed symmetrically spaced apart tubular, metal sections arranged offset from a longitudinal center-line of the motorcycle mainframe;

at least one transverse member interconnecting said left tubular, metal section to said right tubular, metal section, thereby maintaining a fixed interval of spacing between said tubular, metal sections;

an attaching means for securing at least one frontal terminus and one aftward terminus of said left tubular, metal section to a left side of said motorcycle mainframe, and for securing at least one frontal terminus and one aftward terminus of said right tubular, metal section to a right-side of said motorcycle mainframe, thereby mounting said roll-bar structure rigidly upon said motorcycle mainframe for the safety protection of a motorcyclist; wherein aftward terminuses of both said left and right tubular, metal sections are arranged so as to be co-actingly capable of pivoting fore/aft relative to respective forward portions of said left and right tubular, metal sections.

7. A rigid roll-bar subframe structure according to claim 6, wherein a backrest is arranged between said left and right tubular, metal sections and a coupling means allows aftward portions of said left and right tubular, metal sections to be repositioned via said backrest.

8. A rigid roll-bar subframe structure according to claim 6, wherein a foremost windshield is securely arranged transverse between said left and right tubular, metal sections.

* * * * *